United States Patent
Wu et al.

(10) Patent No.: US 6,562,447 B2
(45) Date of Patent: May 13, 2003

(54) FOAMED POLYPROPYLENE SHEET HAVING IMPROVED APPEARANCE AND A FOAMABLE POLYPROPYLENE COMPOSITION THEREFOR

(75) Inventors: Jesse Wu, Dunwoody, GA (US); James H. Han, Alpharetta, GA (US); Phil Jacoby, Marietta, GA (US); Mark C. Novak, Alpharetta, GA (US); Constantine Metaxas, Alpharetta, GA (US); Chin Choi-Feng, Alpharetta, GA (US); Ray O. Mills, Roswell, GA (US); Daan Feng, Alpharetta, GA (US)

(73) Assignee: BP Corporation North America Inc., Warrenville, IL (US)

( * ) Notice: Subject to any disclaimer, the term of this patent is extended or adjusted under 35 U.S.C. 154(b) by 0 days.

(21) Appl. No.: 09/962,598

(22) Filed: Sep. 25, 2001

(65) Prior Publication Data

US 2002/0035164 A1 Mar. 21, 2002

Related U.S. Application Data

(62) Division of application No. 09/387,330, filed on Aug. 31, 1999.
(60) Provisional application No. 60/098,958, filed on Sep. 3, 1998, provisional application No. 60/122,129, filed on Mar. 1, 1999, and provisional application No. 60/128,173, filed on Apr. 6, 1999.

(51) Int. Cl.[7] .............................................. C08F 110/06
(52) U.S. Cl. .................. 428/305.5; 428/515; 428/36.5; 521/143; 521/85; 521/91; 521/92; 521/93
(58) Field of Search .......................... 521/143, 85, 91, 521/92, 93; 428/36.5, 515, 305.5

(56) References Cited

U.S. PATENT DOCUMENTS

| | | | |
|---|---|---|---|
| 3,920,365 A | 11/1975 | Mules | 425/141 |
| 3,969,472 A | * 7/1976 | Driscoll | 264/50 |
| 4,221,624 A | 9/1980 | Eslinger et al. | 156/243 |
| 4,267,146 A | 5/1981 | Kurtz et al. | 262/564 |
| 4,372,739 A | 2/1983 | Vetter et al. | 425/466 |
| 4,596,833 A | 6/1986 | Endo et al. | 521/60 |
| 4,650,816 A | 3/1987 | Bertrand | 521/85 |
| 5,134,174 A | 7/1992 | Xu et al. | 521/143 |
| 5,149,579 A | 9/1992 | Park et al. | 428/213 |
| 5,180,751 A | 1/1993 | Park et al. | 521/51 |
| 5,180,754 A | 1/1993 | Morita et al. | 521/85 |
| 5,225,107 A | 7/1993 | Kretzschmann et al. | 252/350 |
| 5,462,974 A | 10/1995 | Lee | 521/79 |
| 5,494,429 A | 2/1996 | Wilson et al. | 425/192 R |
| 5,688,457 A | 11/1997 | Buckmaster et al. | 264/211 |
| 5,753,155 A | 5/1998 | Hanusa | 264/46.5 |
| 5,912,292 A | * 6/1999 | Sun | 524/301 |
| 5,929,129 A | 7/1999 | Feichtlinger | 521/134 |

FOREIGN PATENT DOCUMENTS

| | | |
|---|---|---|
| EP | 0611793 | 8/1994 |
| JP | 4732585 | 8/1972 |

* cited by examiner

Primary Examiner—James J. Seidleck
Assistant Examiner—Melanie Bissett
(74) Attorney, Agent, or Firm—Wallace L. Oliver; Richard J. Schlott

(57) ABSTRACT

Foamable polypropylene composition comprising a polypropylene resin having an D1238L melt flow rate of from about 0.5 to about 30 g/10 min, and a method for extruding rigid, foamed polypropylene sheet with improved surface appearance having a density in the range 0.4 to about 0.8 g/cm$^3$ $^{+ea}$

20 Claims, 2 Drawing Sheets

FOAMED POLYPROPYLENE SHEET HAVING IMPROVED APPEARANCE AND A FOAMABLE POLYPROPYLENE COMPOSITION THEREFOR

CROSS-REFERENCE TO RELATED APPLICATIONS

This is a divisional of application Ser. No. 09/387,330 filed Aug. 31, 1999.

This application claims the benefit of U.S. Provisional Application No. 60/098,958, filed Sep. 3, 1998, U.S. Provisional Application No. 60/122,129, filed Mar. 1, 1999, and U.S. Provisional Application No. 60/128,173, filed Apr. 6, 1999.

BACKGROUND OF THE INVENTION

This invention relates to polyolefins, and more particularly to improved expanded or foamed compositions comprising propylene polymers. Still more particularly, the invention relates to rigid or semi-rigid polypropylene foam sheet having improved surface appearance. Polypropylene foam sheet according to the invention is readily thermoformable into shaped articles that are particularly useful in rigid and semi-rigid packaging and in fabricating trays, plates, containers and other articles used in food service applications.

Polystyrene has found wide acceptance for use in food service applications because of its good rigidity and shape retention and, as foam sheet, it is readily molded and thermoformed. However, polystyrene articles suffer from low service temperature, and generally are fragile and lack chemical resistance. The food service and packaging arts have long sought alternative materials that do not have these undesirable characteristics.

Polyolefin resins are widely known for their ease of fabrication and are found in a great variety of applications. Considerable effort has been expended in recent years to develop rigid expanded or foamed polyolefin sheet as a replacement for styrene foams, particularly for use in food service applications. Polyethylene resins have moderate strength and high toughness, with softening temperatures in the range of from 105° to 140° C. Such resins are suitable for foam extrusion, giving attractive, low density, thermoformable foam sheet with good low temperature properties. Foam polyethylene sheet and molded foam articles with excellent surface appearance are readily produced from low density polyethylene resins and so have found wide acceptability for use in a variety of packaging applications as well as in food service applications. However, polyethylene foams generally are soft and flexible and have poor heat resistance, and thus may find limited acceptance for food service uses requiring rigidity, and where contact with hot foods is contemplated.

Propylene polymers, or polypropylene resins, are particularly noted for their good heat resistance and mechanical properties, and resin formulations based on polypropylene are supplied to meet the demands imposed by a variety of structural and decorative uses in the production of molded parts for appliances, household goods and autos. Impact modified polypropylene and elastomeric ethylene-propylene copolymers have found application in automotive applications including interior trim as well as in exterior parts such as bumper facia, grill components, rocker panels and the like. Polypropylene resins have the thermal and chemical resistance to withstand exposure to the wide variety of environments and are easily molded at a cost far below that of metal stamping to provide parts that will not rust or corrode and are impact resistant, even at low temperature.

A number of processes for producing polypropylene foam have been disclosed and are well described in the art, including for example the methods disclosed in U.S. Pat. No. 5,180,571 to J. J. Park et al. and those set forth in the references cited and summarized therein. The Park et al. patent is directed to the extrusion of polypropylene to provide foam sheet having a low density generally in the range of from 0.04 to about 0.44 g/cm$^3$.

At the surface of extruded foamed polypropylene sheet there generally may be found a layer consisting substantially of crystalline polypropylene (PP). This surface layer or skin is important to part appearance and surface hardness. The thickness and crystallinity of the PP surface layer that forms depends in part upon extrusion conditions including die temperature and cooling rates, and upon annealing. The Park et al. patent is directed to the extrusion of polypropylene to provide foam sheet with a smooth surface skin and a uniform cell structure. According to the teachings of Park et al. it is necessary to use high melt strength, high melt elasticity polypropylene with a particularized combination of molecular and rheological characteristics including bimodal molecular weight distribution and a minor component that is highly branched to produce foam sheet having a smooth surface skin and a uniform cell structure. Patentees provide comparisons showing that low density foam sheet extruded using conventional or generic polypropylene resins, further characterized as polypropylene resins with monomodal molecular weight distributions and an absence of significant branching, generally have roughened sheet surfaces and non-uniform microcellular structure and are unacceptable for commercial use.

The surfaces of extruded polyolefin foam sheet generally lack the smooth, shiny, uniform and substantially unblemished surfaces observed with extruded styrenic foam sheet, particularly including higher density ABS foam sheet. For example, surface roughness is commonly encountered when extruding polyethylene foam sheet, and lack of uniformity in cell structure and distribution at the surface is visually more readily apparent because of the transparent nature of unfilled polyethylene. Sensible surface roughness, that is, roughness that can be sensed tactilely, may be reduced by contacting the lower melt temperature polyethylene sheet with a polishing roll during the extrusion process to give a smooth, more even surface. The surface imperfections that remain are mainly visible density variations and are generally uniformly distributed, providing a textured or marbleized surface appearance that is pleasing and generally acceptable.

Rigid polypropylene foam sheet obtainable by the processes currently known and practiced in the art continues to be somewhat lacking in surface appearance characteristics. Characteristically, polypropylene foam sheet extruded with conventional processes and using conventional or generic polypropylene resins will have regularly spaced markings in the form of alternating bands or corrugation-like markings extending the length of the sheet in the machine direction. In light, low-density foams obtained from conventional polypropylene resins, particularly soft, flexible foams having a densities of 20 lb/ft$^3$ (0.3 g/cm$^3$) and lower, these bands may have the form of a regularly spaced, wave-like or sinusoidal distortion, forming a corrugated sheet. The bands or corrugations become less pronounced for rigid foam sheet and, particularly at higher foam densities, are seen as surface flaws or appearance defects that take the form of linear, valley-like surface depressions along the machine direction.

The surface roughness of sheet extruded using these higher melting resins is more difficult to smooth adequately using a polishing roll. Moreover, the imperfections and visible density variations found in the surfaces of extruded polypropylene foam sheet are often not uniformly distributed over the surface, and are generally quite visible, even for sheet that otherwise is tactilely smooth. In rigid, higher density foams such as are desirable for the production of food service articles the defects more often appear as a pattern of alternating linear bands of high and low foam density, characterized by readily visible variations in translucence and surface gloss, possibly including surface voids, bubbles, streaks and uneven color. Such flaws may be without significant effect on the mechanical properties of the foam, and generally do not affect the performance of finished goods fabricated from such foam. However, in consumer goods, food packaging and the like, these visible surface defects and related cosmetic flaws are highly undesirable, thus limiting acceptance of rigid polypropylene foam sheet by the industry.

Coextrusion of multilayer sheets having solid outer skins and a foamed core has been disclosed in the art and is widely used to overcome surface appearance problems encountered in the production of a variety of prior art foam sheet materials including those made from polystyrene and ABS. Foam core sheet, provided with a shiny or glossy unfoamed surface layer formed of the same or another resin, may be improved in resistance to surface abrasion and cuts and have a superior appearance. The more rigid skin serves to stiffen the foam structure, allowing a lighter and thinner structure while attaining maximum bending stiffness. Foam sheet coextrusion processes are well described in the art for use with a variety of resins such as polystyrene and ABS, and methods have been recently disclosed for use in the coextrusion of multilayered foam sheet comprising polyolefins including polypropylene. Coextrusion processes suffer the disadvantage of generally requiring more costly feedblocks, dies and related machinery having a more complicated design, thereby increasing the complexity of the operation and raising the cost of producing such foam sheet.

Thus, there continues to be a need for rigid, foamed polypropylene sheet comprising conventional generic polypropylene resins with reduced visible surface defects and related cosmetic flaws and having the attractive, defect-free surface appearance necessary for acceptance in the food service and packaging industries, and for polypropylene compositions comprising conventional generic polypropylene resins that are suitable for use in the extrusion of such foam sheet.

SUMMARY OF THE INVENTION

The invention pertains to the production of rigid, foamed polypropylene sheet significantly improved in surface appearance. More particularly, the invention relates to improved foamable polypropylene compositions comprising a propylene polymer, a crystallization nucleating agent, a bubble nucleating agent, and a blowing agent for use in the production of rigid, foamed polypropylene sheet having a high density, greater than about 0.45 g/cm$^3$, with excellent strength and thermal insulating properties. When extruded employing the improved extrusion apparatus and die according to the further teachings' set forth herein, the resulting high density, foamed polypropylene sheet may be characterized as having a more uniform cellular structure together with an improved surface appearance including significant reduction in the surface banding, corrugation and related visible flaws commonly encountered in extruded, high density, rigid foam sheet; the invention thus may be further characterized as directed to improved extruded, rigid, foamed polypropylene sheet.

Rigid, foamed polypropylene sheet according to the invention has a low average surface roughness uniformly distributed over the surface of the foam sheet, and a substantial absence of corrugation and surface banding. When molded or otherwise thermoformed, the invented foam sheet will afford rigid or semi-rigid articles having improved surface appearance while retaining a good balance of mechanical properties including stiffness and toughness. The invention thus may also be characterized as directed to molded articles having improved appearance comprising expanded or foamed polypropylene.

DESCRIPTION OF THE PREFERRED EMBODIMENT(S)

Figure 1:
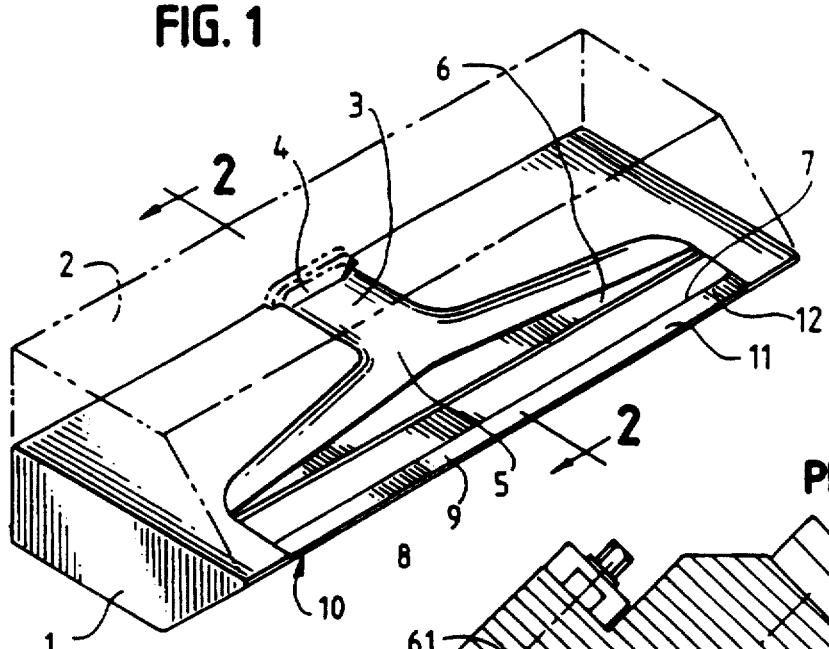
FIG. 1 is a diagrammatic, perspective view, partially in phantom, of a typical coathanger-type sheet extrusion die.

The particular advantage of the invention as disclosed herein is that high density foam sheet having excellent surface appearance may be provided using any of the great variety of commercially available polypropylene resins, and without resorting to specialty resin grades and blends. The polyolefin compositions useful in the extrusion of thermoformable, rigid, foamed polypropylene sheet according to the invention will preferably comprise a substantially linear polypropylene homopolymer, or a copolymer of propylene and a minor amount, up to about 30 wt. %, more preferably up to about 20 wt. % of an alpha-olefin which may have up to 6 carbon atoms. The polymer may be syndiotactic or isotactic, however it is preferable to use an isotactic polypropylene homopolymer having an isotactic index of greater than 0.85, more preferably greater than 0.92, the articles obtained from said homopolymer having better physical properties. The melt flow index of the polymer will be from about 0.3 to about 10, preferably from about 1.0 to about 4.0 g/10 min., determined according to ASTM D1238, Condition L. Such polymers are readily prepared by a variety of catalyzed polymerization processes well known in the art, including processes employing Ziegler-Natta catalysts and those based on metallocene catalysts.

A wide variety of extrusion grade, film-forming, substantially linear polypropylene resins without significant branching having an essentially monomodal molecular weight distribution and the requisite MFR are readily available in the trade and most will be found useful for providing foam sheet having improved surface appearance according to the teachings of this invention.

According to the teachings of the prior art, it has been generally believed that high melt strength resin formulations are required in order to successfully extrude foamed polypropylene having good cell structure and acceptable surface appearance, and the art has developed specialty formulations comprising particular grades of propylene resins having particularly defined molecular weight and rheological properties including a bimodal molecular weight distribution comprising a highly branched minor component for these uses. Blend compositions having the requisite melt strength have also been formulated using polypropylene that has been modified, for example through crosslinking, or with particular polymeric additives, highly branched olefin polymers or the like. Although these specialty resin grades and resin formulations may also be found suitable for use in the practice of this invention, foam sheet having improved surface appearance may be readily produced from readily available generic grades of polypropylene, i.e. propylene polymer resins with monomodal molecular weight distributions and without a significant level of branching, hence such specialty resin compositions are not required.

As disclosed and described in the art, foamable polypropylene compositions will further comprise a blowing agent and a crystallization nucleating agent.

The blowing agent may be of the type well known and widely used for the production of expanded polystyrene and polyolefins including polypropylene, including organic blowing agents such as, for example, azodicarbonamide, diazoaminobenzene, azo-bis-isobutyronitrile and analogs thereof, and inorganic blowing agents such as, for example, ammonium carbonate, sodium bicarbonate and the like. Physical blowing agents such as nitrogen, carbon dioxide and other inert gases and agents that undergo phase change from liquid to gas during the foaming process such as chlorofluorocarbons (CFC), HCFC, low boiling alcohols, ketones and hydrocarbons, are also known for these uses and may also be found useful in the practice of this invention. The blowing agent may further comprise one or more additives to reduce its decomposition temperature.

The amount of blowing agent to be used depends on its nature and on the desired density for the expanded polypropylene and will be selected according to practices well understood by those skilled in the resin formulating art. Generally, blowing agents are available to the trade in the form of concentrates; the concentrates will be added to the formulation at levels that will provide from about 0.2 to about 10 wt. % active foaming agent, preferably from about 0.4 to about 5 wt. % active foaming agent, based on total weight of the formulation. The amounts of physical blowing agents such as liquid blowing agents and inert gases needed to provide the desired foam densities may readily be determined according to common commercial practice.

As set forth in the art, a crystallization nucleating agent is provided to increase the number of crystallization nuclei in the molten polypropylene, thereby increasing the crystallization speed and promoting crystallization from the melt, solidifying the resin at a higher temperature. Generally, non-nucleated polypropylene will begin crystallizing at around 120° C. with a peak in crystallization rate near 110° C. Nucleated polypropylene resins may start to crystallize at temperatures as great as about 135 to 140° C., with a peak around 130° C. Nucleated resin will solidify rapidly with improved melt strength to thereby reduce sag in the extruded foam sheet. The crystallization nucleating agent will generally be used in an amount of from about 0.01 to about 0.5 wt. %, preferably from about 0.05 to about 0.3 wt. %. Examples of such agents disclosed in the art and employed for improving the crystallization speed include organic sodium phosphates such as sodium bis(4-tert-butyl-phenol)phosphate, sodium benzoate and mixtures comprising a monocarboxylic aromatic acid or a polycarboxylic aliphatic acid and a silicate or an alumino-silicate of an alkali or alkaline earth metal. The use of organic sodium phosphates as crystallization agents is disclosed in the art, for example in U.S. Pat. No. 4,596,833.

Other agents disclosed in the art for improving melt strength of polyolefins include sorbitol, dibenzilidene sorbitol and related compounds. These agents have been described in the art as networking agents for use in modifying the low shear melt viscosity and low shear melt strength of polyolefins and as crystallization nucleating agents. However, as will be seen, such networking agents are ineffective in providing high density, rigid, foamed polypropylene sheet according to the invention.

Further modifiers and additives for foamable polypropylene compositions are also disclosed and described in the art. Such modifiers and additives may be employed in amounts according to the common practice in the art, including lubricants, coloring and/or drying agents, fire-proofing agents, thermal and UV stabilizers, antioxidants, antistatic agents and the like. It will be understood by those skilled in the art that such additional modifiers and additives will be selected to avoid undesirable interaction with the resin, blowing agents and nucleating agents, and will be used at levels appropriate to their function and purpose according to common practice in the foam resin compounding and formulating arts.

The improved foamable polypropylene compositions of this invention will further comprise a bubble nucleating agent. Bubble nucleating agents create sites for bubble initiation and desirably influence cell size and minimize the occurrence of large bubbles and open-cell structure, thereby providing particularly attractive and uniform high quality foam sheet. Use of a bubble nucleating agent in combination with a crystallization nucleating agent also further improves foam processability and melt rheology, as well as desirably enhancing important mechanical and thermal properties of the foam sheet, particularly rigidity or stiffness.

The bubble nucleating agent employed in formulating improved compositions useful for foam sheet extrusion according to the invention may be selected from the variety of inert solids disclosed in the art to be useful as bubble nucleating agents, including mixtures of citric acid and sodium bicarbonate or other alkali metal bicarbonate, talc, silicon dioxide, diatomaceous earth, kaolin, polycarboxylic acids and their salts, and titanium dioxide. Other inert solids disclosed in the art for these purposes may also be found suitable. The nucleating agent will preferably have a mean particle size in the range of from about 0.3 to about 5.0 microns (μm), and will be present at a concentration of up to about 5 wt. %, preferably from about 0.01 to about 5 wt. %, and more preferably from about 0.5 to about 2 wt. % of the total weight of the formulation. At higher concentrations the cell structure becomes undesirably small; further, the nucleating agent tends to agglomerate during processing.

A variety of compounding and blending methods are well-known and commonly used in the art and most may be adapted to mix and compound the components of foamable polypropylene formulations. Conveniently, the resin together with stabilizers and further additives and modifying components that are not thermally sensitive, whether in powder, pellet, or other suitable form, may be mixed and melt compounded using a high shear mixer, e.g., a twin-screw extruder at temperatures effective to render the resinous components molten and obtain a desirably uniform blend. Thermally sensitive components of the formulations, including blowing agents, may be physically mixed with the resin in powder or pellet form using conventional dry-blending methods just prior to feeding the mixture to the extruder. Plasticating the resin in a compounding extruder and feeding the additives and modifying components to the molten composition through a port in the extruder is also commonly practiced in the art. Downstream addition to the melt also may be found particularly useful for foam sheet extrusion where a physical blowing agent in the form of a gas is employed.

Processes for extruding foam sheet generally employ an extrusion apparatus having single or multiple extruders, which may be single or twin screw extruders, to conduct the mixture of polypropylene resin and additives through the plasticating and mixing steps, and provide a molten, foaming or foamable resin mass to the inlet of a sheet extrusion die. Preferably the extrusion die will be a coathanger type sheet extrusion die wherein the inlet extends to a coathanger-shaped plenum in the form of a relatively wide and vertically narrow cavity, elongated in the horizontal or transverse direction (Y axis) and relatively narrow in the vertical direction (Z axis). The resin flow direction or machine direction may also be referred to as the extrusion axis (X axis). The plenum is in liquid communication with an exit port or mouth extending along the width or Y axis of the die, forming a slit defined by die lips. Molten, foaming resin enters the die through the inlet, is spread across the width of the die by way of the plenum, passes between die lips and exits through the exit port or die exit in a molten or semi-molten state as a continuous sheet. The extruded sheet will then be cooled to become solidified, for example by being passed through a roll stack to cool the foam and finish the sheet. Differential roll speeds and take-up speeds may be employed to draw the foam sheet, orienting the crystalline polypropylene and achieving a final form and thickness for the sheet.

Turning now to the drawings, it may be seen in FIG. 1 that a typical coathanger die, generally designated by the reference numeral 10, for extruding thermoplastic sheet will comprise a first or lower half 1 and a second or upper half 2, indicated in phantom. Assembled in opposed relationship, the halves form cavity 3. Molten foaming resin enters the die through inlet 4 and flows into coathanger-shaped plenum 5. Plenum 5 spreads the molten resin uniformly across the width of the die as it flows through the preland passage 6 to melt well 7. Adjustable choke means (not shown) may be included to provide control of resin flow, and any differences in pressure still remaining may be evened out by melt well 7. The molten resin continues through planar extrusion passageway or die land 9 defined by the opposing, spaced apart faces of lower die lip 11 and upper die lip 12, exiting the die through exit opening 8 and forming a sheet.

It will be understood that the die body may include passages for heating and cooling, and further that clamping and fastening means and means for assembling the die to the extruder, also required, have been omitted from the drawings for clarity.

Figure 2:
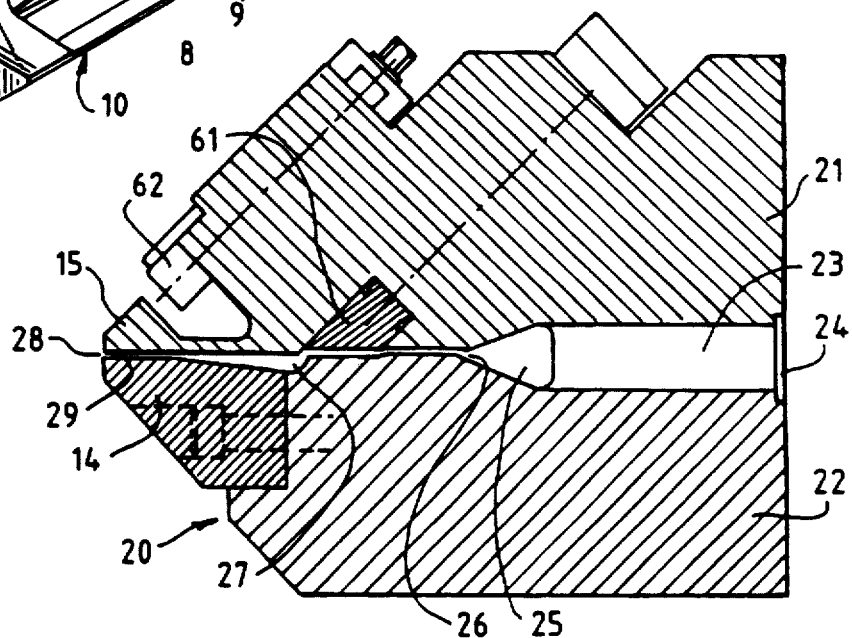
FIG. 2 is a sectional view of a prior art polyolefin sheet extrusion die, taken along line 2—2 of FIG. 1.

In FIG. 2 it will be seen that Prior Art sheet extrusion die 20 includes assembled upper and lower halves 21 and 22, together defining cavity 23, and upper and lower die lips 14 and 15. As described above, molten foaming resin will be supplied under pressure by extruder means (not shown) to die cavity 23 through inlet 24, in fluid communication with exit opening 28. Flowing into the coathanger plenum 25, and dammed by the narrowing of the cavity at preland passage 26, the melt stream is spread across the width of the die by plenum 25 and fills melt well 27. The molten resin, further regulated by adjustable choke means 61, flows from melt well 27 and passes through extrusion passageway or die land 29, exiting the die through exit opening 28 as continuous foam sheet.

Either or both of die lips 14 and 15 may be made fixed or removable as desired. As shown in FIG. 2, lower die lip 14 is made removable, secured to the lower body portion 12 by a plurality of bolts or other suitable fastening means, while upper die lip 15 is fixed. Upper die lip 15 may be provided with adjusting means 62 as shown, for the purpose of adjusting the gap between the die lips at exit opening 28.

In prior art sheet extrusion dies such as shown in FIG. 2, the opposing faces of the upper and lower die lips 14 and 15 that make contact with the molten resin stream are planar and substantially parallel, defining a smooth extrusion passageway or die land 29 having a substantially uniform height or thickness. The continuous foam sheet exiting the die lips in a molten or semi-molten state will have sufficient go internal pressure to undergo further expansion on exiting, reaching a final thickness and surface condition when the temperature of at least the outer skin falls below the crystallization temperature and solidifies.

To complete the finishing of the extruded foam sheet, conventional sheet extrusion processes generally employ a finishing roll stack (not shown) which may contain chilled rolls to further cool the sheet. Optionally, cooling means such as an air stream-may be provided at the exit port to quickly cool the surfaces of the emerging foam sheet. Though initially shaped by the exit opening 28, the final thickness of the foam sheet will thus depend in part on the cooling means employed, the roll gap within the finishing roll stack, and the ratio of the extrusion rate to the takeup rate, which may be selected to draw the sheet as desired and orient the crystalline polypropylene component of the foam sheet.

Figure 3:
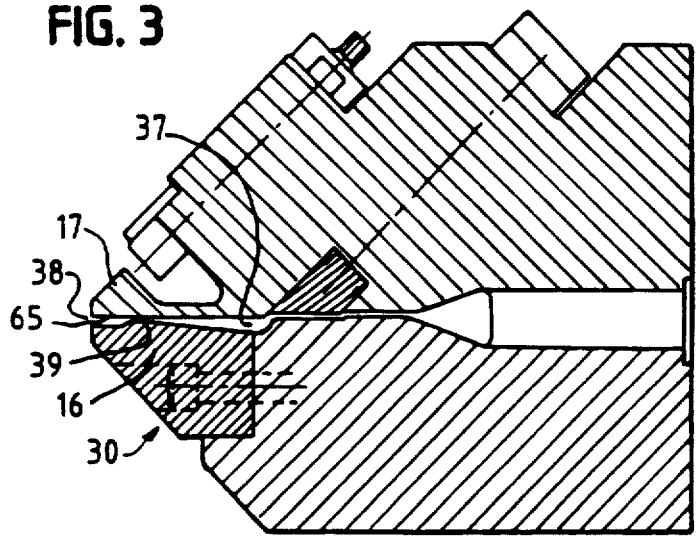
FIG. 3 is a sectional view, taken along line 2—2 of FIG. 1, showing an improved sheet extrusion die according to the invention.

In FIG. 3, showing an embodiment of an improved sheet extrusion die according to the invention, the improvement over the prior art die of FIG. 2 will be seen to reside in the modification of die lip 16 which, together with upper die lip 17, will provide a die land 39 with widening aperture downstream along the extrusion axis from near melt well 37 to exit opening 38, thereby providing expansion zone 65. Molten foaming resin flowing from melt well 37 of die 30 enters expansion zone 65, expands under the influence of the pressure drop and exits the exit opening or die port as a continuous foam sheet. Foam expansion to a given thickness is substantially completed within the die land. By avoiding any significant further expansion after exiting the die port, surface banding, corrugation and similar surface markings will be significantly reduced and may be entirely eliminated. Such defects are commonly seen in foam sheet extruded using prior art extrusion dies without such an expansion zone such as, for example, the die shown in FIG. 2.

It may be found desirable to aid the cooling of the foam sheet while in the expansion zone 65, thereby speeding crystallization, and provision may be made for including cooling means in the upper and lower die lips 16 and 17 near exit opening 38 for this purpose. Finishing rolls, draw rolls and the like may be employed as desired to complete the process and finish the foam sheet to a final thickness and form.

Figure 4:
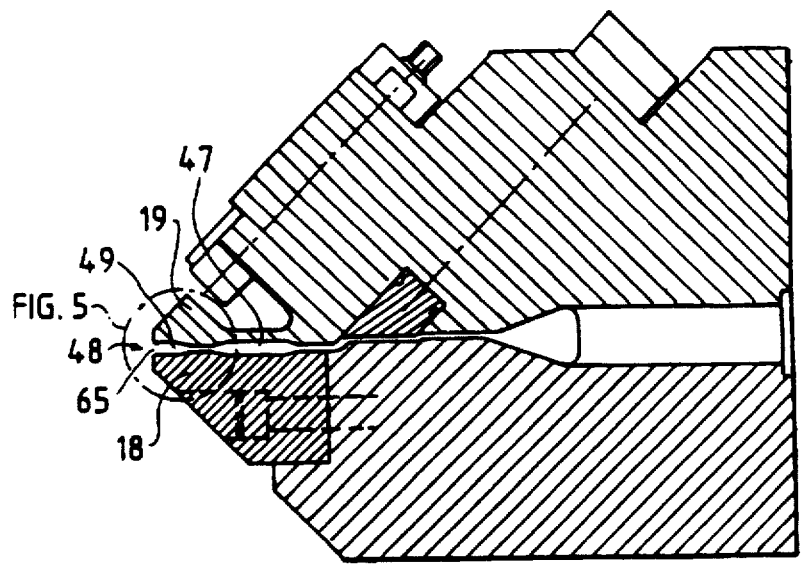
FIG. 4 is a sectional view, taken along line 2—2 of FIG. 1, showing an alternative embodiment of the improved sheet extrusion die according to the invention.

In FIG. 4, showing an alternative embodiment according to the invention, die land 49 is provided with a widening aperture downstream along the extrusion axis by modification of lower die lip 18 and upper die lip 19, thus providing an expansion zone 65 whereby foam expansion to a given thickness may be substantially completed within the die land.

The geometry of extrusion dies will be designed for particular conditions characterized from the rheology of the melt. It will be readily understood that placing particular numerical values on the variation of die gap geometry in the manner set forth above would be unduly limiting in that the die opening or die gap is a function of the desired final foam product thickness as well as many other factors. If one skilled in the art were to determine the proper die geometry and size, and the process throughput rate to produce a given product, the appearance and uniformity of the sheet product are subject to improvement as described as a function of the modifications of the die lip according to the invention.

In defining a complete, improved process of producing a foamed polypropylene sheet according to the invention, one must take into account the die gap or opening and the length of the die land or extrusion passage, as well as operating parameters including throughput rate, product size and bulk density. The geometry parameters are not determined independent of the operating parameters.

Figure 5:
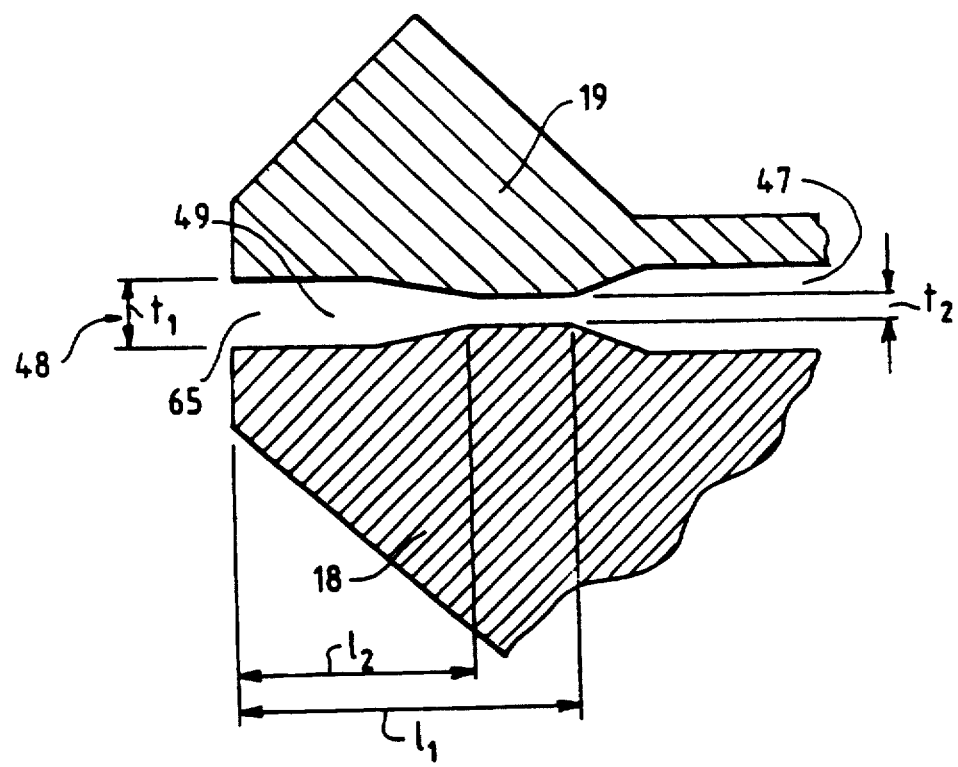
FIG. 5 is a fragmentary, enlarged sectional view showing the detail of the die land portion of the embodiment of FIG. 4.

Turning to FIG. 5, wherein the die land of FIG. 4 is shown in enlarged, fragmentary, view, it will be seen that the widening aperture of die land 49 may be further characterized by the height or thickness $t_1$ of the passage at die exit opening 48 and the height or thickness $t_2$ at the narrow point, i.e. the minimum height within the die land. Generally, the initial thickness of the extruded foam sheet will be determined substantially by the height of the exit opening 48. Hence, thickness $t_1$ may be as small as 0.01 inch (0.025 cm) to as great as 0.2 inch (0.5 cm) or greater, depending upon whether the die is intended for the production of thin, dense, expanded film-like sheet or thicker foam sheet, and may be even greater where the die will be used in producing foam board or the like. To be suitable for the production of foamed sheet having acceptable surface appearance according to the invention, the geometry may be characterized in part by the difference $(t_1-t_2)$, i.e. the difference between the height or thickness $t_1$ of the passage at exit opening 48 and the height or thickness $t_2$ at the minimum height within the die land, which will lie in the range of from about 0.004 to about 0.10 inch (0.01–0.25 cm). Alternatively described, the geometry of the die land for producing suitable foam sheet over the range of interest may be characterized by the ratio $t_1/t_2$ between the height or thickness $t_1$ of the passage at exit opening 48 and the minimum height within the die land $t_2$, which will be in the range of from about 2 to about 5.

The geometry of the die land suitable for producing foam sheet according to the invention may be further characterized by length $l_1$ of die land or passageway 49, determined from the downstream edge of melt well 47 to said exit opening, and length $l_2$ of the widened portion forming expansion zone 65. Generally, the length of the initial, narrow portion of the die land, defined by the difference $(l_1-l_2)$, i.e. by the difference between the length of die land 49 and the length of the expansion zone 65, will lie in the range of from about 0.125 Inch to about 0.75 inch (0.3–1.9 cm).

These parameters will be found to serve generally for the design of improved extrusion dies to meet the requirements for producing extruded foam sheet according to the invention over a wide range of production volumes, including the embodiment shown in FIG. 3.

In the operation of the foam sheet extrusion apparatus, upper die lip adjustment means may be employed to modify the die gap or opening within a narrow range to further control sheet thickness. The improved sheet extrusion die according to the embodiment of FIG. 4 may be operated using a take-up rate selected to remove the foam sheet from the die prior to expanding to the full height $t_1$ of the die exit opening 48, allowing the operator to adjust and maintain sheet thickness over a range limited by the minimum and maximum heights $t_1$ and $t_2$ within the aperture of expansion zone 65.

Foamed polypropylene sheet extruded employing the improved extrusion die according to the invention will have improved surface appearance, with little or no surface banding, corrugation or similar surface markings, and may be further characterized as having a low level of surface roughness that is uniformly distributed, giving the foam sheet a pleasing and acceptable cosmetic appearance.

Surface roughness and uniformity in surface roughness may be determined by image analysis and thus quantified, thereby providing a numerical basis for distinguishing acceptable from unacceptable foam sheet. More particularly, rough surfaces reflect light nonuniformly; areas of a surface that are smooth are more reflective, and in a gray scale photomicrograph of a surface appear white or light gray. Areas containing defects such as the voids and indentations that form corrugation bands will scatter light and thus appear in a gray scale photomicrograph as dark gray or black. When digitized using computerized image analysis methods and translated to a binary, black/white image, the average surface roughness of the foam sheet will be related to the amount of black in the binary image, determined as a fraction of the total surface area.

The uniformity of the distribution of roughness over the surface may be also determined from the photomicrograph, again by image analysis. The uniformity of surface roughness will be related to the variation in roughness over the area of the photomicrograph, determined by examining equal areas of the image, averaging the roughness for each area, and then obtaining the standard deviation. The surface having greatest uniformity will be the surface having the lowest standard deviation.

Foam sheet with a low average surface roughness, uniformly distributed over the surface as reflected by a low standard deviation in roughness over the examined area generally will be considered to have an acceptable appearance.

It will be understood that improved sheet extrusion dies according to the invention may also be found useful for the extrusion of unfoamed polypropylene sheet, or of multilayered foam sheet or foam core sheet, and further that foam extrusion dies having a die land including an expansion zone according to the teachings hereof may be made in alternative configurations, including improved annular dies and in configurations suitable for the extrusion of foam board and plank, and in profile extrusion of shaped foam structures with improved surface appearance.

The methods and processes of this invention, and the formulations and improved extrusion die employed therein, may be used for the production of improved foamed polypropylene over a wide range of densities including low density, flexible foam for packaging uses, and for the manufacture of foamed polypropylene plank and board with thicknesses greater than ¼ inch (0.6 cm) to as great as 1 inch (2.5 cm) or more. Rigid, foamed polypropylene sheet having a thickness in the range of from about 10 mils (0.25 mm) to about 250 mils (6 mm), preferably from about 20 mils (0.5 mm) to about 80 mils (2 mm), and with foam densities in the range of from about 0.4 g/cm$^3$ to about 0.8 g/cm$^3$, preferably from about 0.45 g/cm$^3$ to about 0.8 g/cm$^3$ and still more preferably from about 0.5 to about 0.75 g/cm$^3$, will be particularly preferred. The rigidity of the high density foam sheet of this invention is reflected in the high tensile modulus of the foam sheet, generally above about 150,000 psi (1000 MPa), more particularly in the range of from about 150,000 psi to about 300,000 psi (1000–2000 MPa).

At lower densities, foam polypropylene sheet is more flexible and lacks the rigidity desired for rigid food packaging uses and the like. Thus, the lower density polypropylene foam sheet disclosed in U.S. Pat. No. 5,149,579 is characterized by patentees as having tensile and flexural moduli values in the range of from 10,000 to 50,000 psi (70–340 MPa). At foam densities above about 0.8 g/cm$^3$, foam polypropylene sheet will lack the thermal insulation characteristics desired for many applications.

Thin, rigid foam sheet produced according to the invention will also have good thermal insulating properties, with a thermal conductivity in the range of from about 0.08 W/m° K. to about 0.15 W/m° K. Foam sheet having a high degree of rigidity in combination with good thermal insulating properties will be particularly attractive and important for acceptability in food service applications, for example, for use in the manufacture of cups and similar containers for handling hot or chilled liquids, and where food must be maintained at temperatures significantly above or below ambient temperature for some period of time. Foam intended for these uses will preferably have a thermal conductivity below about 0.14 W/m° K. and more preferably below about 0.11 W/m° K.

Polypropylene foam sheet produced from the improved polypropylene compositions according to the invention may be used in a conventional thermoforming operation to form rigid and semi-rigid articles. Typically, articles are formed from sheet having a thickness of from about 10 mils (0.25 mm) up to 200 mils (5 mm) or above. A thermoformed article typically ranges from about 20 to 80 mils (0.5–2 mm). Generally, processes for thermoforming foam sheet include the steps of heating the foam sheet to a temperature where it is deformable under pressure or vacuum, supplying the softened foam sheet to a forming mold, and cooling the foam sheet to form a rigid or semi-rigid article having the shape of the mold. To avoid collapsing the foam structure of the sheet, the temperature employed in the heating step will fall in a narrow range which does not exceed the melt temperature of the resin. The processing window or temperature range for thermoforming, and particularly the upper temperature limit, may be conveniently assessed by a thermomechanical analysis procedure whereby a sample of the sheet is heated while monitoring the change in thickness of the sheet as a function of temperature, using a thermomechanical analyzer probe. Upon reaching and then exceeding the upper limit of the processing range, the thickness of the sheet will be observed to rapidly decrease as the foam structure collapses and the probe penetrates the sheet. Generally, extruded foam sheet comprising polypropylene may be processed with good retention of foam structure at temperatures of from about 130° to about 145° C., and particular formulations may be found to be processable at temperatures as great as 150° C. while retaining foam structure.

In another aspect of the invention, a surface layer may be applied by co-extrusion techniques. Typically, top and bottom surface layers with thickness ratios of the layer to the foam core of about 1:1000 and preferably 1:2000 or above may be used. Preferably, the surface layer is a propylene polymer with a similar composition (except for blowing agents) to the foam core, although any compatible propylene polymer may be used. Also, if desired a barrier resin layer also may be applied such as polyethylene or ethylenevinylacetate polymer. An advantage of using co-extruded surface layers is incorporating pigments or other specialized additives to the surface layers. Since the amount of surface layer is much smaller than the foam core, the use of pigments or other additives is minimized. This may be beneficial in recycling the article.

Extruded polypropylene foam sheet having improved surface appearance according to the invention has application in a wide variety of physical shapes and forms in addition to molded goods. Rigid and semi-rigid foams, including molded and laminated products prepared therefrom, not only possess good physical properties and excellent chemical resistance at room temperature, but they retain their strength and good performance over a wide range of temperatures and for long periods of time. Molded articles formed from the preferred foam composition of this invention have markedly improved surface appearance and may be particularly useful in food packaging where appearance and cosmetic considerations are highly important to consumer acceptance. Examples include plates, cups, trays, and containers such as for take-out food and home meal replacement items. Since these articles are made from propylene polymer with a relatively high softening point, the articles typically may be used in a microwave oven. The foam sheet and molded articles may also find wide Use in applications where mechanical strength, rigidity and thermal insulation are important considerations, such as in durable goods and appliance components, and in medical and plumbing applications where resistance to hot, humid environments may be particularly important, as well as in safety equipment and protective gear.

The invention will be better understood by way of consideration of the following illustrative examples and comparison examples, which are provided by way of illustration and not in limitation thereof. In the examples, all parts and percentages are by weight unless otherwise specified.

EXAMPLES

The PP resins employed in the following examples were prepared using the Amoco Gas Phase Process. The process is disclosed generally in "Polypropylene Handbook" pp. 297–298, Hanser Publications, NY, 1996, and is more fully described in U.S. Pat. No. 3,957,448, the teachings of which are incorporated herein in their entirety by reference thereto, and in "Simplified Gas-Phase Polypropylene Process Technology" presented in Petrochemical Review March, 1993.

PP resins are initially produced in powder form. The resin powder may be used directly, or may be first compounded and pelletized by strand extrusion using a compounding extruder, and then chopping the strand. Pelletizing may be accomplished according to standard practice, for example by dry-blending dried resin with such stabilizing components and additives as may be required and feeding the blend to a ZSK-30 twin-screw extruder. The polymer, extruded through a strand die into water, is then chopped to form pellets. PP resins are generally characterized by molecular weight; among the measurements employed for describing resin molecular weight, in addition to resin viscosity, is the resin Melt Flow Rate or MFR. Generally, molecular weight is inversely related to MFR.

The component materials employed in following examples, and the abbreviations therefor, include:

Polypropylene Resins

PP-1: propylene homopolymer, powder, MFR=2 g/10 min.

PP-2: propylene homopolymer, powder, MFR=1 g/10 min.

PP-3: propylene homopolymer, pelletized, MFR=2 g/10 min.

PP-4: propylene-ethylene copolymer, pelletized, MFR=2 g/10 min.

Crystal Nucleating Agents

Nucl-1: sodium benzoate

Nucl-2: organic sodium phosphate, obtained as MARK NA-11 from Adeka Argus Chemical Company Nucl-3: dimethyldibenzylidene sorbitol, obtained as Millad 3988 from Milliken Chemical Company Blowing Agents FPE-50: Proprietary sodium bicarbonate-based blowing agent, obtained as SAFOAM FPE-50 from Reedy International Corporation, added as concentrate, 50 wt. % active.

CF-40E: Proprietary sodium bicarbonate-based blowing agent, obtained as BI CF-40E from BI Chemical Company, added as concentrate, 40 wt. % active.

H-40E: Proprietary sodium bicarbonate-based blowing agent, obtained as BI H-40E from BI Chemical Company, added as concentrate, 40 wt. % active.

Bubble Nucleating Agent

Talc: talc having a 0.8 micron mean particle size, maximum particle size 6 microns, obtained from Specialty Minerals Inc. as Microtuff AG-609 and AGD-609 grades.

Test methods employed in evaluating the foam sheet produced in the following Examples include:

Melt Flow Rate (MFR) was determined by ASTM D1238, Condition L (230° C., 2.16 Kg load).

Density was determined according to ASTM D1622.

The crystallization temperature (Tc) and melting temperature (Tm) were determined by differential scanning calorimetry following substantially the procedures of ASTM E-793.

Thermal conductivity was determined using a C-matics model TCEM-DV instrument from Dynatech Corporation following test procedures published by the manufacturer.

Tensile testing was carried out substantially according to the procedures of ASTM D638.

Evaluation of cell dispersion and size was made by scanning electron microscopy (SEM) on cross sections microtomed from PP foam sheet. Specimens were taken along the transverse and machine directions. The cut specimens were mounted on SEM stubs, coated with Au/Pd, and examined on a Hitachi S-4000 scanning electron microscope in secondary electron imaging mode, accelerated voltage 10 kV. Cell distribution was subjectively rated visually on a basis of excellent, very good, good, fair, poor and very poor uniformity.

Examples 1–6

In Examples 1–6 and Control Examples C-1–C-3, powdered propylene homopolymer resin having an MFR of 1.0 (PP-1), was compounded and extruded into foam sheet substantially by the following general procedure. The formulations are summarized in the following Table I, wherein all components are in wt. % based on total weight of the formation; balance of the formulation is PP-1. Examples 1–6 will be seen to comprise a bubble nucleating agent (talc) and a crystallization nucleating agent; the formulations of Control Examples C-1–C-3 contain only a bubble nucleating agent, without a crystallization nucleating agent.

Polypropylene powder and the indicated amount of additives other than blowing agent were dry blended in the amounts indicated, fed to a ZSK-30 compounding extruder, melt mixed and extruded to form pellets. The resin pellets were dry-blended with the indicated amount of blowing agent and gravity fed through the hopper to a 2.5 inch (6.4 cm) single-screw NRM extruder, having a 24/1 L/D screw, with barrel and die heating. The barrel of the extruder was maintained at a temperature in the range of about 360° to about 380° F. (182–193° C.). The molten, foaming mixture was extruded through a 12 inch (30.5 cm) width coathanger die maintained at 380° F., pulled in an S-wrap through a three-roll finishing roll stack maintained at a temperature of approximately 130° F. (54° C.), located approximately 6 inches (15 cm) from the die exit, and taken up on a winder. For the purposes of these examples, the take-up speed employed was selected to provide only nominal drawing and orientation of the polypropylene foam in the machine or flow direction.

An improved extrusion die substantially as shown in FIG. 3 and having a ratio $t_1/t_2=1.2$ and a ratio $l_1/l_2=3.5$, was employed for extruding the foam sheet of Examples 1–6 and C-1–C-3. Foam sheet for each of the formulations was extruded under low shear conditions and also under high shear conditions to demonstrate the effect of mixing on cell distribution and uniformity. A low extruder screw speed of 86 rpm was employed for low shear mixing, and a higher extruder speed of 120 rpm for high shear mixing.

Samples of the foam sheet were taken for determination of mechanical and thermal properties as described below.

All formulations set forth in the following Table I also contain 0.08 wt. % Irganox 168 and 0.04 wt. % Irganox 1010 stabilizers, from Ciba Geigy. Examples 2–4 contain 0.02 wt. % Kyowa DHT4A grade of synthetic hydrotalcite, obtained from Mitsui, to neutralize acidic catalyst residues. The resin component of these formulations (balance to 100 wt. %) is PP-1 propylene homopolymer. All formulations were combined with 0.5 pbw (active) SAFOAM FPE-50 blowing agent per hundred parts formulation before extruding.

TABLE I

| | Example | | | | | | | | |
|---|---|---|---|---|---|---|---|---|---|
| | 1 | 2 | 3 | 4 | 5 | 6 | C-1 | C-2 | C-3 |
| Talc (%) | 0.6 | 0.75 | 0.9 | 1.1 | 0.75 | 0.75 | 0.6 | 0.75 | 0.9 |
| Nucl-1 (%) | 0.1 | 0.1 | 0.1 | 0.1 | — | — | — | — | — |
| Nucl-2 (%) | — | — | — | — | 0.06 | — | — | — | — |
| Nucl-3 (%) | — | — | — | — | — | 0.17 | — | — | — |
| MFR (g/10 min.) | 2.63 | 2.97 | 3.47 | 3.11 | 3.09 | 3.10 | 2.93 | 2.79 | 2.95 |
| Tc (° C.) | 122 | 124 | 124 | 125 | 128 | 121 | 121 | 121 | 121 |
| Tm (° C.) | 160 | 160 | 160 | 160 | 160 | 161 | 161 | 160 | 160 |

Notes: For compounding details, test methods, see text.

The presence, as in Examples 1–6, or absence, as in Control Examples C-1–C-3, of a crystallization nucleating agent is without effect on the melting temperature Tm. Crystallization temperature Tc for the uncompounded polypropylene employed for these Examples, PP-1, 127° C.; however, as will be seen in the Control Examples C-1–C-3, Tc is reduced to about 121° C. by the addition of talc. Thus, nucleating agents Nucl-1 and Nucl-2 serve to overcome the effect of talc on crystallization temperature Tc, and Nucl-2 provides a further improvement in Tc. Compare Tc for Examples 1–5 with C-1–C4.

Sorbitol compounds, described in the art as networking agents suitable for nucleating crystallization in polyolefins, appear to provide little improvement in crystal melt temperature for foamable formulations according to the invention based on polypropylene.

Density and thermal conductivity determined for samples of foam sheet, extruded at low and at high shear conditions for each of the formulations as described above, are summarized in Table II, below.

TABLE II

| | Low Shear | | | High Shear | | |
|---|---|---|---|---|---|---|
| Ex. No. | Density Kg/m² | Thermal cond. W/m ° K. | Cells | Density Kg/m² | Thermal cond. W/m ° K. | Cells |
| 1 | 0.71 | 0.15 | v. good | 0.63 | 0.11 | v. good |
| 2 | 0.90 | 0.19 | poor | 0.83 | 0.14 | poor |
| 3 | 0.79 | 0.17 | fair | 0.67 | 0.12 | good |
| 4 | 0.83 | 0.15 | fair | 0.72 | 0.13 | fair |
| 5 | 0.75 | 0.15 | good | 0.78 | 0.14 | good |
| 6 | 0.78 | 0.13 | fair | 0.74 | 0.13 | fair |
| C-1 | 0.71 | 0.12 | fair | 0.74 | 0.12 | fair |
| C-2 | 0.75 | 0.13 | fair | 0.67 | 0.12 | fair |
| C-3 | 0.75 | 0.12 | good | 0.71 | 0.11 | good |

Notes: For compositions, test methods, see text and Table 1.

The effect of high shear mixing in the extruder is to increase melt temperature, thus improving cell distribution and reducing average cell size. It will be apparent from comparing the densities of foams produced in low shear conditions with the corresponding foams produced under high shear conditions that high shear mixing conditions generally provide a lower density foam with more uniform cell distribution as reflected in better insulating properties (reduced thermal conductivity).

The mechanical properties for low shear and high shear foam sheet of Examples 1–6 and Comparison Examples C-1–C-3 were also determined. The tensile properties are summarized in the following Table III. Samples were tested in the machine direction.

TABLE III

| | Low Shear | | | High Shear | | |
|---|---|---|---|---|---|---|
| Ex. No. | Tensile Yield Kpsi (MPa) | E Yield % | Tensile Mod. Kpsi (MPa) | Tensile Yield Kpsi (MPa) | E Yield % | Tensile Mod. Kpsi (MPa) |
| 1 | 2.83 (19.5) | 4.3 | 212 (1460) | 2.24 (15.4) | 5.3 | 161 (1110) |
| 2 | 4.52 (31.2) | 5.1 | 289 (1990) | 4.09 (28.2) | 5.9 | 274 (1890) |
| 3 | 3.95 (27.2) | 4.5 | 266 (1830) | 2.78 (19.2) | 5.5 | 198 (1370) |
| 4 | 3.60 (24.8) | 4.2 | 253 (1740) | 2.44 (16.8) | 5.2 | 181 (1250) |
| 5 | 3.42 (23.6) | 4.4 | 241 (1660) | 3.58 (24.7) | 5.5 | 236 (1630) |
| 6 | 3.21 (22.1) | 4.2 | 246 (1700) | 3.58 (24.7) | 7.9 | 194 (1340) |
| C-1 | 3.03 (20.9) | 5.5 | 208 (1430) | 3.33 (23.0) | 5.4 | 227 (1570) |
| C-2 | 2.98 (20.5) | 4.9 | 195 (1340) | 2.98 (20.5) | 5.9 | 198 (1370) |
| C-3 | 3.33 (23.0) | 5.0 | 217 (1500) | 2.98 (20.5) | 6.3 | 189 (1300) |

Notes: For compositions, test methods, see text and Table 1.

Examples 7–12

In the following Examples 7–12, the formulations summarized in Table IV were compounded and extruded substantially as described for Examples 1–6, using a screw speed of 120 rpm to assure good mixing. An improved extrusion die, substantially as shown in FIG. 3 and having a ratio $t_1/t_2=1.2$ and a ratio $l_1/l_2=3.5$, was employed for extruding the foam sheet.

The formulations also contain 0.08 wt. % Irganox 168 and 0.04 wt. % Irganox 1010 stabilizers, from Ciba Geigy. The balance of the formulation (to 100 wt. %) is the indicated resin component. The formulations were combined with 0.5 pbw (active) blowing agent per hundred parts formulation before extruding.

TABLE IV

| | Example | | | | | |
|---|---|---|---|---|---|---|
| | 7 | 8 | 9 | 10 | 11 | 12 |
| PP | PP-2 | PP-1 | PP-1 | PP-3 | PP-2* | PP-2* |
| Talc wt.% | 1 | — | 1 | 1 | 0.75 | 0.75 |
| Nucl-1 wt % | 0.1 | 0.1 | 0.1 | 0.1 | — | — |
| Nucl-2 wt % | — | — | — | — | 0.08 | 0.08 |
| Blowing Agent | FPE-50 | FPE-50 | FPE-50 | FPE-50 | CF40E | H-40E |
| Thickness | | | | | | |
| mil | 35 | 40 | 42 | 53 | 35 | 38 |
| mm | 0.89 | 1.02 | 1.07 | 1.35 | 0.89 | 0.97 |
| Cell size, ave. μm | 90 | 120 | 120 | 160 | 130 | 210 |
| Cell dispersion | good | v. good | fair | good | v. good | poor |
| SEM Surface appearance | — | — | — | no voids, v. good | no voids, excl. | voids, poor |
| Thermal cond. W/m ° K. | 0.11 | 0.12 | 0.12 | 0.13 | 0.11 | 0.11 |
| Density g/cm³ | 0.65 | 0.65 | 0.73 | 0.66 | 0.62 | 0.56 |

Notes:
*Pelletized resin. For compounding details and test methods, see text and Table I.

It will be seen that not all blowing agents provide equivalent results, the H-40E blowing agent giving foam with poor cell dispersion and large, irregular, open and interconnected cells when viewed by SEM (Example 12). Although the surfaces of the foam sheet of Examples 7–12 had no significant banding, the foam sheet of Example 12 had a rough surface, with voids; apparently, these defects were the result of using a less effective, coarser particle foaming agent. The cells of Examples 7–11, viewed by SEM in cross section taken in the transverse direction, appeared to be essentially circular in cross section. Viewed in cross section along the machine direction, the cells of these foams will be seen to be elongated along the direction of flow.

Foam sheet having thermal conductivity below about 14 W/m° K., preferably below about 11 W/m° K., are particularly desirable for use in food service applications, particularly in the production of cups and similar articles for use in storing and serving hot or cold foods. For comparison, the thermal conductivity of extruded unfoamed, stabilized PP-2 polypropylene sheet having a nominal thickness of 40 mils (1 mm) is 0.20 W/m° K. The thermal conductivity of stock used for producing paper cups is about 0.12 W/m° K., while for Styrofoam cup stock the value is about 0.09 W/m° K.

Comparison Example C4

For comparison purposes, foam sheet was extruded using a prior art die and the foamable polypropylene formulation of Example 11, set forth in Table IV. The prior art extrusion die was substantially as shown in FIG. 2. The foam sheet had an average thickness of 35 mils (0.9 mm) and an average density of 0.62 g/cm³.

The foam sheet of the Comparison Example C-4 was seen to have poor cell dispersion when viewed by SEM and, on visual inspection, the surface of the foam sheet was visibly flawed, with bands running in the machine direction, defects typically seen in foam sheet extruded from commercial, unmodified polypropylene resins using prior art dies.

As noted in Table IV above, when inspected by SEM, the surface appearance of the invented foam sheet of Example 11 was seen to be excellent, with no observable surface voids. On visual inspection, the foam sheet of Example 11 had no visible banding or other significant surface defects.

Surface appearance of various foam sheet specimens may be further compared by rating the surface roughness and uniformity for each using roughness parameters obtained through image analysis of photomicrographs of the surface of the sheet. Specimens of sheet suitable for rating are extruded substantially as in Examples 10 and 11; for comparison purposes, representative specimens of unacceptable foam sheet are provided as described in the Comparison Example C-4 and rated. Representative specimens of foam sheet, summarized in Table V as Examples A–C, are produced to provide further comparisons by extruding generic polypropylene resins using prior art processes as in the Comparative Example C-4.

In making the ratings, an area of the sheet surface approximately 5 mm×16 mm was viewed by SEM and photographed. The examined area was selected to include obvious surface roughness, together with a corrugation, line if one existed. Visual appearance ratings were then determined by image. analysis of 16 equal areas, each 1 mm wide by 5 mm in length, selected to run parallel to the corrugation line. The fraction (%) of dark areas for binary images of each of the strips, the standard deviation (%) in dark area for the 16 strips, and the average dark area (%) for the total area examined, were determined. The results of these evaluations are summarized in a table V.

Average Roughness is related to the % of dark area for the total area examined; high values indicate the presence of more voids and indentations, i.e. a rougher appearing surface.

Variation in average roughness between areas of the surface indicates nonuniform distribution of cells, voids and indentations on the surface. For a completely uniform surface, whether rough or smooth, there would be little variation in average roughness between various areas of the surface.

Standard deviation is related to the uniformity of the surface roughness, and indirectly to the uniformity of internal cell distribution; low values indicate more uniformly distributed cells, voids and indentations on the surface, and a more uniform distribution of cells internally.

The criteria for rating and indexing surface roughness and uniformity are summarized in tabular form as follows:

| Rating | Roughness (Ave., %) | Uniformity (Std. Dev., %) |
|---|---|---|
| 1 | <10 | 3 |
| 2 | 10–20 | 3–4 |
| 3 | 20–30 | 4–5 |
| 4 | 30–40 | 5–6 |
| 5 | 40–50 | 6–7 |
| 6 | 50–70 | 7–10 |
| 7 | >70 | >10 |

TABLE V

Surface Roughness and Uniformity Ratings of Representative Specimens of Foamed Polypropylene Sheet

| | Specimen according to Ex.: | | | | | |
|---|---|---|---|---|---|---|
| | 10 | 11 | C-4 | A | B | C |
| Roughness, Ave. % | 24.6 | 74.6 | 59.2 | 20.6 | 38.4 | 14.3 |
| Roughness rating: | 3 | 7 | 6 | 3 | 4 | 2 |
| Std. Deviation % | 3.2 | 3.7 | 22.0 | 4.4 | 5.2 | 7.0 |
| Uniformity rating: | 2 | 2 | 7 | 3 | 4 | 6 |
| min. % | 18.4 | 68.0 | 29.3 | 14.1 | 26.2 | 5.8 |
| max. % | 32.6 | 79.3 | 94.3 | 30.2 | 47.5 | 30.7 |
| Visual Appearance: | B | C | E | C | D | F |

Notes:
% values are % of area; see text.
Visual Appearance:
A excellent;
B good;
C very light corrugation;
D corrugation lines fine, clear;
E corrugation lines thick, clear;
F very non-uniform with no corrugation It will be seen that the primary characteristic of foam sheet having an acceptable surface appearance is uniformity in the distribution of surface roughness. When the surface roughness is uniformly distributed, whether low as in Example 10 or high as in Example 11, foamed polypropylene sheet will have good visual appearance. Very faint corrugation lines will result from a less uniform distribution of surface defects as in Example A. The corrugations become more noticeable and have a deleterious effect on surface appearance as distribution becomes more nonuniform. See Example B and the Comparison Example C-4. Conversely, low surface roughness, when distributed in a highly non-uniform manner, provides sheet having a very undesirable surface appearance as in Example C.

Acceptable foam sheet will thus be seen to be sheet having a uniform distribution of surface roughness, reflecting an overall uniformity in internal cell distribution. For foam sheet according to the invention, the standard deviation in surface roughness, a measure of uniformity, will generally be less than about 6.0%, more preferably less than about 5.0% and most preferably below about 4.0%.

The invention will thus be seen to be directed to an improved polypropylene composition for use in the production of extruded foam sheet, more particularly, rigid or semi-rigid foamed polypropylene sheet having a thickness of from about 20 to about 80 mils(0.5–2 mm) and a density of from about 0.4 to about 0.8 g/cm³. Rigid, foamed polypropylene sheet according to the invention will be significantly improved in surface appearance, with the substantial absence of the banding and corrugation markings commonly seen in extruded rigid polypropylene foam of the prior art. The invention may also be characterized as directed to rigid foamed polypropylene sheet comprising generic polypropylene as defined herein and having a density of from about 0.4 to about 0.8 g/cm³, and a uniform distribution of surface roughness which may be further defined as a standard deviation in the average surface roughness generally below about 6%, more preferably below about 5.0% and most preferably below about 4.0%.

Although the invention has been described and illustrated by way of specific embodiments set forth herein, those skilled in the art will recognize that a variety of polypropylene homopolymer and copolymer resins including impact-modified polypropylene resins such as, for example, those disclosed in the art based on an isotactic polypropylene containing a dispersed phase comprising a copolymer may also be found useful. Still further modifications and variations in the processes employed herein for the production of foam sheet will be readily apparent to those skilled in the resin formulating and fabricating art and in the extrusion arts, and such variations and modifications will be understood to lie within the scope of the invention as defined by the appended claims.

We claim:

1. A rigid, extruded sheet having a density of from about 0.4 to about 0.8 g/cm³ comprising foamed, substantially linear propylene polymer having an essentially monomodal molecular weight distribution and a melt flow rate of from about 0.5 to about 30 g/10 min. determined according to ASTM D1238 condition L, the surfaces of said sheet having a standard deviation in surface roughness of less than about 6%.

2. The rigid, extruded sheet of claim 1 wherein said standard deviation in surface roughness is less than about 5%.

3. The rigid, extruded, foamed sheet of claim 1 obtained by foam extrusion of a substantially linear polypropylene resin having having an essentially monomodal molecular weight distribution and a melt flow rate of from about 0.5 to about 30 g/10 min. determined according to ASTM D1238 condition L, said resin having dispersed therein from about 0.05 to about 0.5 wt. % of a crystallization nucleating agent, from about 0.01 to about 5 wt. % of a finely divided inert solid and from about 0.1 to about 25 wt. % of a foaming agent.

4. The foamed polypropylene sheet of claim 3 having a thickness of from about 10 mil to about 250 mil.

5. The foamed polypropylene sheet of claim 3 having a thickness of from about 10 mil to about 80 mil.

6. The foamed polypropylene sheet of claim 3 wherein said density is in the range of from about 0.45 to about 0.8 g/cm³.

7. The foamed polypropylene sheet of claim 3 herein said finely divided inert solid has a mean particle size in the range of from about 0.3 to about 5 microns and is selected from the group consisting of talc, silicon dioxde, diatomaceous earth, kaolin and titanium dioxide.

8. The foamed polypropylene sheet of claim 3 wherein said crystallization nucleating agent is selected from the group consisting of organic sodium phosphates and sodium benzoate.

9. The foamed polypropylene sheet of claim 3 wherein said crystallization nucleating agent is sodium benzoate.

10. The foamed polypropylene sheet of claim 7 wherein said inert solid is talc.

11. A molded article comprising foamed substantially linear polypropylene resin, said article molded by thermoforming the extruded, rigid, foamed polypropylene sheet of claim 3.

12. An article of claim 11 wherein the thickness is about 20 to about 80 mils.

13. An article of claim 11 on which is co-extruded surface layers of a compatible polymer.

14. An article of claim 11 on which is co-extruded surface layers of a propylene polymer which contains pigment.

15. An article of claim 11 in the form of a plate, cup, tray, or container.

16. An article of claim 12 the surfaces of said article having a standard deviation in surface roughness of less than about 5%.

17. A molded article comprising foamed, substantially linear propylene polymer having an essentially monomodal molecular weight distribution and a melt flow rate of from about 0.5 to about 30 g/10 min. determined according to ASTM D1238 condition L, the surfaces of said molded article having a standard deviation in surface roughness of less than about 6%.

18. An article of claim 17 in the form of a plate, cup, tray, or container.

19. An article of claim 17 on which is co-extruded surface layers of a compatible polymer.

20. An article of claim 17 on which is co-extruded surface layers of a propylene polymer which contains pigment.

* * * * *